Figure 1:
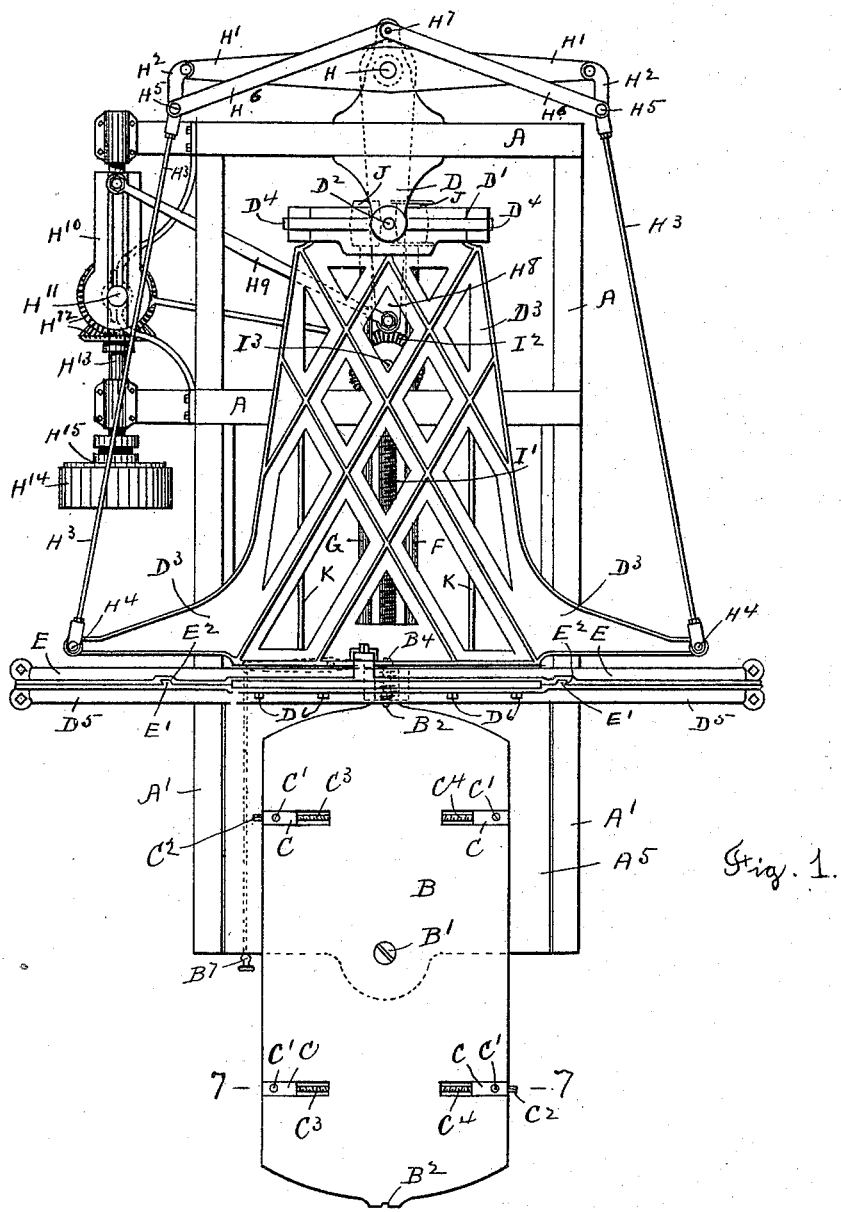

(No Model.) 3 Sheets—Sheet 1.

E. L. TAFT.
MOLDING MACHINE FOR FORMING WARPED OR IRREGULAR SURFACES.

No. 573,050. Patented Dec. 15, 1896.

Witnesses
A. C. Whiting.
Emma Kister.

Inventor
Edward L. Taft.
By his Attorney
Rufus B. Fowler.

(No Model.)
3 Sheets—Sheet 2.
E. L. TAFT.
MOLDING MACHINE FOR FORMING WARPED OR IRREGULAR SURFACES.
No. 573,050. Patented Dec. 15, 1896.
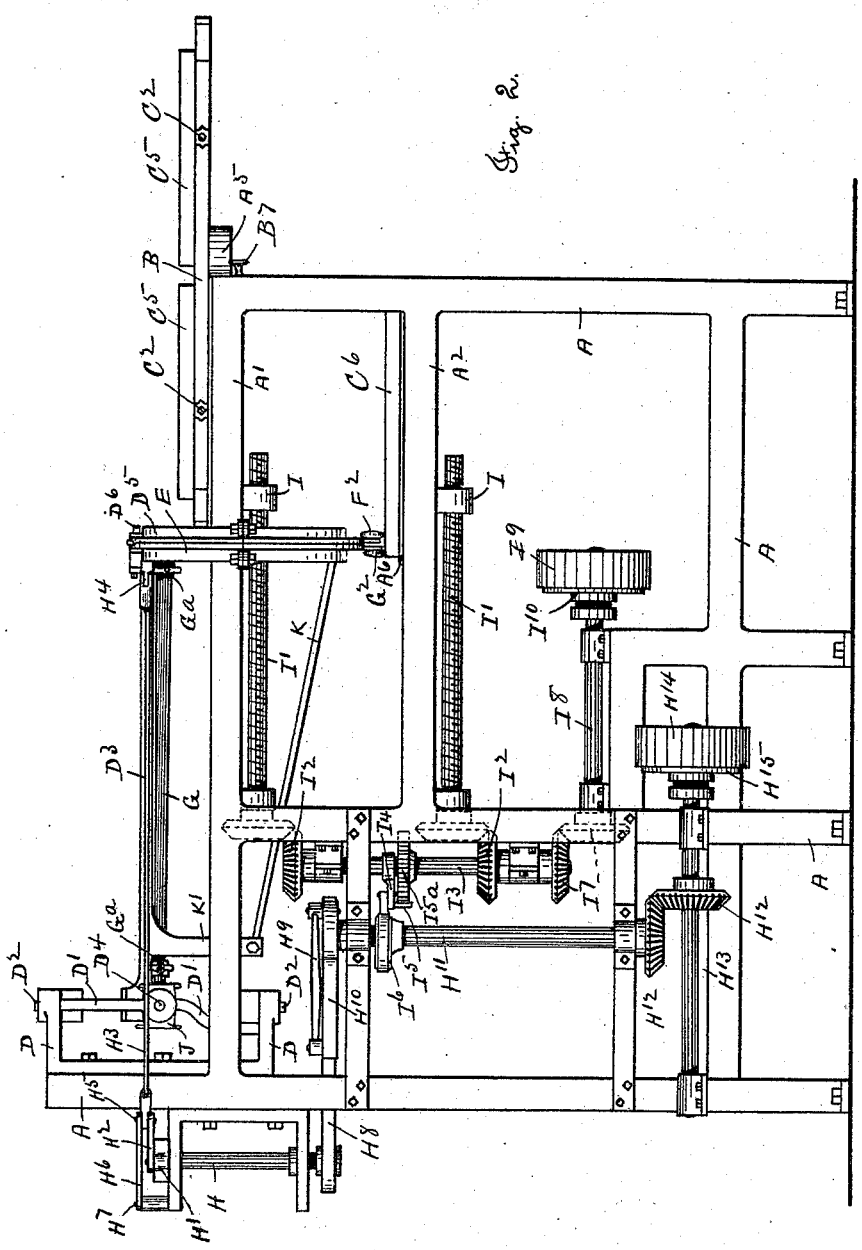
Witnesses
A. L. Whiting
Emma Kester
Inventor
Edward L. Taft.
By his Attorney
Rufus B. Fowler

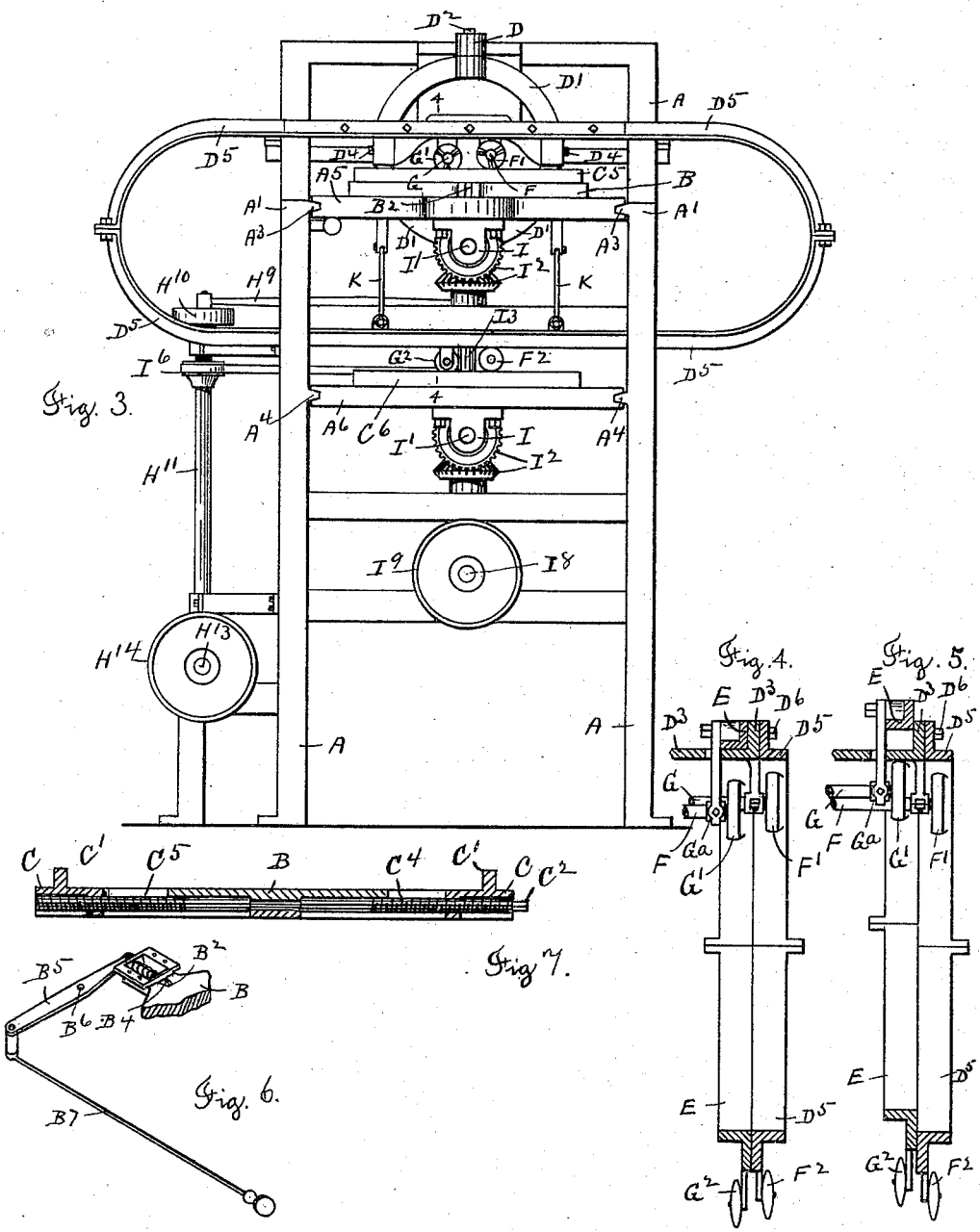

UNITED STATES PATENT OFFICE.

EDWARD L. TAFT, OF GARDNER, MASSACHUSETTS, ASSIGNOR OF ONE-HALF TO JAMES L. CHAPMAN, OF FITCHBURG, MASSACHUSETTS.

MOLDING-MACHINE FOR FORMING WARPED OR IRREGULAR SURFACES.

SPECIFICATION forming part of Letters Patent No. 573,050, dated December 15, 1896.

Application filed June 12, 1894. Serial No. 514,339. (No model.)

*To all whom it may concern:*

Be it known that I, EDWARD L. TAFT, a citizen of the United States, residing at Gardner, in the county of Worcester and State of Massachusetts, have invented a new and useful Improvement in Molding-Machines for Forming Warped or Irregular Surfaces, of which the following is a specification, accompanied by drawings forming a part of the same, in which—

Figure 1 denotes a top view of a machine embodying my invention. Fig. 2 is a side view of the same. Fig. 3 is an end or front view. Fig. 4 is a vertical sectional view of the vibrating yoke, the section being shown on line 4 4, Fig. 1. Fig. 5 is a vertical sectional view of the vibrating yoke on the same plane as that shown in Fig. 4, but with one cutter raised. Fig. 6 is a detached view of the latching mechanism by which the revolving work-table is held in position; and Fig. 7 is a sectional view of the work-table on line 7 7, Fig. 1.

Similar letters refer to similar parts in the different figures.

My present invention relates to a wood-working-machine, having for its object to mold or shape a warped or irregular surface corresponding with the surface of a determined pattern, and in the accompanying drawings I have represented a machine embodying my invention adapted to shape the irregular surface of a wooden seat for a chair; and my present invention comprises certain improvements and modifications in a similar machine shown and described in my pending application for Letters Patent of the United States, Serial No. 494,195.

Referring to the accompanying drawings, A denotes the framework of the machine, provided with the parallel horizontal rails $A'$ and $A^2$, upon the inside of which are ways $A^3$ and $A^4$ for the sliding carriages $A^5$ and $A^6$. Upon the upper sliding carriage $A^5$ is pivoted a rotating table B, capable of rotating about a stud held in the carriage $A^5$. Notches $B^2 B^3$ are formed in the opposite ends of the rotating table B, which are alternately engaged by a spring-actuated bolt $B^4$. (Represented in broken lines in Fig. 1 and shown with its connected operating mechanism in perspective view in Fig. 6.) The spring-bolt $B^4$ is connected with a lever $B^5$, which is pivoted at $B^6$ to the carriage $A^5$ and is provided with a pull-rod $B^7$, held in ways beneath the carriage $A^5$, to allow the spring-bolt $B^4$ to be withdrawn from the notch in the table B by the operator. The table B has two sets of clamping mechanism for holding the chair-seats to be operated upon, consisting of sliding blocks C, having pins $C'$ projecting upward to engage holes in the under side of the chair-seat. When a chair-seat has been placed in position on the table with one set of pins $C'$ entering holes in the under side of the seat, the sliding blocks C, carrying the pins, are drawn toward each other by the rotation of a spindle $C^2$, journaled in the table and provided with right and left hand screw-threads $C^3$ and $C^4$. Figs. 2 and 3 show chair-seats $C^5$ upon the upper surface of the table B, but in Fig. 1 the seats are removed in order to disclose the clamping devices described above.

Upon the lower carriage $A^6$, directly beneath the chair-seat upon the upper carriage $A^5$, is fastened a metal plate $C^6$, having its upper surface of the desired shape of the surface of the chair-seat and forming a pattern-plate over which the pattern-rolls run for the purpose of controlling the position of the revolving cutters, as hereinafter described.

D D denote brackets projecting from the frame of the machine, between which is pivoted a circular frame $D'$ by means of gudgeons $D^2 D^2$, and within the circular frame $D'$ is pivoted an oscillating frame $D^3$ by gudgeons $D^4 D^4$, so that the free end of the frame $D^3$ will be capable of a vibrating motion about a vertical axis on the gudgeons $D^2 D^2$ and also of a rising-and-falling motion about a horizontal axis on the gudgeons $D^4 D^4$. To the free end of the vibrating frame $D^3$ the upper side of an elliptical yoke $D^5$ is attached by means of bolts $D^6$.

Immediately behind the yoke $D^5$ is a corresponding elliptical yoke E, connected with and capable of a vertical sliding motion upon the yoke $D^5$ by means of ribs $E' E'$, forming ways on the yoke $D^5$ and entering the grooves $E^2 E^2$ on the yoke E. Journaled in bearings beneath the vibrating frame $D^3$ is the cutter-shaft F, carrying a revolving cutter $F'$, and upon the lower side of the fixed yoke $D^5$ is attached a rotating pattern-wheel $F^2$, arranged to run over and in contact with the irregular surface of the pattern-plate $C^6$, and as the pattern-roll $F^2$ rests upon the irregular surface of the pattern-plate $C^6$ the yoke $D^5$ will receive a rising-and-falling motion upon the gudgeons $D^4 D^4$.

Beneath the vibrating frame $D^3$ is a second cutter-shaft G, with its rear end journaled in swiveled bearings $G^a G^a$, the bearing at the rear end of the shaft being attached to the frame $D^3$ and the bearing at the front end being attached to the vertically-sliding yoke E.

The cutter-shaft G carries a cutter G' similar to the cutter F' on the shaft F, and to the lower side of the yoke E is attached a pattern-roll $G^2$ similar to the pattern-roll $F^2$, which is carried by the yoke $D^5$. The pattern-roll $G^2$, as it is traversed across the irregular surface of the pattern-plate $C^6$, will impart a rising-and-falling motion to the yoke E along the ways $A^3$ and $A^4$ independently of the rising-and-falling motion of the yoke $D^5$.

The yokes $D^5$ and E are traversed back and forth over the pattern-plate $C^6$ by means of a rocking shaft H, journaled in vertical bearings at the rear of the machine and having a cross-bar H' attached to its upper end, to the ends of which are pivoted links $H^2 H^2$, connecting the ends of the cross-bar H' with the rods $H^3 H^3$, which are pivoted at $H^4 H^4$ to the vibrating frame $D^3$. The links $H^2 H^2$ are pivoted to the rods $H^3 H^3$ by the pintles $H^5 H^5$, and pivoted upon the pintles $H^5$ are the links $H^6$, which are pivoted at their opposite ends to a fixed stud $H^7$. To the lower end of the shaft H is attached a radial arm $H^8$, connected by a link $H^9$ with a revolving crank-plate $H^{10}$, carried by the vertical shaft $H^{11}$, which is driven by the beveled gears $H^{12} H^{12}$ from a horizontal shaft $H^{13}$, driven through a belt-pulley $H^{14}$ and clutching mechanism $H^{15}$. As the shaft H and cross-bar H' are rocked a vibrating movement will be imparted to the frame $D^3$ through the connecting-links $H^2$ and rods $H^3$, the links $H^6$ serving to hold the pivots $H^5 H^5$ at a uniform distance from the fixed stud $H^7$.

The carriages $A^5$ and $A^6$ are provided on their lower sides with screw-threaded lugs I I, which are engaged by the rotating screws I' I', which are simultaneously rotated through the gears $I^2$ by a vertical shaft $I^3$, to which an intermittent motion is given by a vibrating arm $I^4$, carrying a pawl $I^5$, engaging a ratchet-wheel $I^{5a}$ on the shaft $I^3$ and actuated by an eccentric $I^6$ on the vertical shaft $H^{11}$. The shaft $I^3$ is disconnected by disengaging the pawl $I^5$, and a quick return motion is imparted to the carriages $A^5$ and $A^6$ by means of the belt-pulley $I^9$, clutch $I^{10}$, and shaft $I^8$, which is connected with the shaft $I^3$ by the bevel-gears $I^7$. Belt-pulleys J J are carried upon the inner ends of the cutter-shafts F and G, by which the cutters are rotated from any conveniently-located counter-shaft.

The connection between the elliptical yoke $D^5$ and the frame $D^3$ is strengthened by the brace-rods K K, connecting the lower portion of the yoke $D^5$ with arms K', which depend from the under side of the frame $D^3$.

The operation of the machine is as follows: A pattern-plate $C^6$ of the desired shape is fastened upon the lower sliding carriage $A^6$. A chair-seat $C^5$ is placed upon the outer end of the rotating table B and clamped in position by the sliding blocks C and pins C'. The table is then released by pulling the rod $B^7$ and withdrawing the spring-bolt $B^4$, allowing the table to be swung round one-half a revolution on the stud B' and again latched by the bolt $B^4$, bringing the chair-seat directly over the pattern-plate $C^6$ and allowing a second chair-seat to be clamped upon the table while the first is being cut. A vibrating movement is then given to the frame $D^3$ upon its gudgeons $D^2 D^2$, causing the yokes $D^5$ and E to be traversed back and forth, carrying the pattern-rolls $F^2$ and $G^2$ across the pattern-plate $C^6$. The pattern-roll $F^2$, as it runs over the pattern-plate, will impart a rising-and-falling motion to the yoke $D^5$, rocking the frame $D^3$ upon its gudgeons $D^4 D^4$ and causing the revolving cutter F' to rise and fall with the movement of the pattern-roll $F^2$, as determined by the irregularity of the surface of the pattern-plate $C^6$. As the pattern-roll $G^2$ moves over the surface of the pattern-plate it will impart a rising-and-falling motion to the yoke E, which will slide upon the ways E' E', and as the cutter G' is carried upon a shaft whose forward end is journaled in a bearing attached to the yoke E the vertical movement of the yoke E will carry the cutter G', causing the cutter G' to rise and fall in correspondence with the motion of the pattern-roll $G^2$, as determined by the irregularity of the surface of the pattern-plate $C^6$. Each of the cutters will therefore have an independent vertical motion independently of each other and as the frame $D^3$ is vibrated the cutters F' G' will cut independent paths and with an independent vertical motion.

The use of two cutters largely increases the efficiency of the machine, as each vibration of the frame $D^3$ causes two paths to be cut across the chair-seat, and the employment of two cutters allows one to be used as a finishing-cutter, using the advancing cutter to remove a portion of the stock and the succeeding cutter to leave the surface of the chair-seat smoother and in condition to be smoothed by sandpapering.

What I claim as my invention, and desire to secure by Letters Patent, is—

1. In a wood-molding machine for forming a warped or irregular surface, the combination of a vibrating frame capable of vibrating in a horizontal plane, of a pair of revolving cutter-heads carried by said frame; said cutter-heads having parallel axes but different planes of rotation, a pattern-surface, a pair of pattern-rolls carried by said frame over said surface, said rolls being operatively connected with said cutter-heads, whereby each of said cutter-heads is raised or lowered independently of the other, and means for feeding the work transversely to the line of movement of said cutter-heads as they are carried by said vibrating frame, substantially as described.

2. In a wood-molding machine for forming warped or irregular surfaces, the combination with a frame pivoted at one end so as to be capable of a traversing movement in a horizontal plane, and also of an angular movement in a vertical plane, of a revolving cutter carried by said pivoted frame, a pattern-roll carried by said pivoted frame in contact with the pattern-plate, a pattern-plate by which the vertical movement of said frame is controlled, a yoke carried by said frame and capable of a vertical sliding movement in ways on said frame, a revolving cutter connected with said vertically-sliding yoke and a pattern-roll carried by said yoke and in contact with said pattern-plate, whereby said yoke and connected cutter is given an independent movement in a vertical plane, substantially as described.

3. The combination of the frame $D^3$, yoke $D^5$, revolving cutter $F'$ carried by said frame, yoke E capable of a vertical movement along ways on said yoke $D^5$, a cutter $G'$ carried by said yoke E, pattern-rolls $F^2$ and $G^2$ carried by said yokes $D^5$ and E, and a pattern-plate in contact with said pattern-rolls, whereby said cutters are raised and lowered independently of each other, as determined by the configuration of said pattern-plate, substantially as described.

4. The combination with the frame $D^3$, pivoted at one end so as to be capable of a vibrating motion in a horizontal plane, of the actuating mechanism, consisting of a rocking shaft H, cross-bar $H'$ attached to said shaft, links $H^2$, $H^2$ pivoted to said cross-bar, rods $H^3$, $H^3$ pivoted to said frame $D^3$ and to said links $H^2$, $H^2$ and links $H^6$, $H^6$ pivoted upon a fixed stud and upon the ends of said rods $H^3$, $H^3$, a revolving cutter carried by said frame $D^3$, substantially as described.

Dated this 9th day of June, 1894.

EDWARD L. TAFT.

Witnesses:
WALTER F. RICE,
HARRY F. ALLEN.